United States Patent [19]
Spry

[11] Patent Number: 5,155,634
[45] Date of Patent: Oct. 13, 1992

[54] SUPERCONDUCTING REFLECTION FILTER

[75] Inventor: Robert J. Spry, Tipp City, Ohio

[73] Assignee: The United States of America as represented by the Secretary of the Air Force, Washington, D.C.

[21] Appl. No.: 386,796

[22] Filed: Jul. 20, 1989

[51] Int. Cl.$^5$ ............................. H03J 3/22; G02B 5/22
[52] U.S. Cl. ..................................... 359/885; 359/723; 505/828; 505/848; 356/234
[58] Field of Search ................. 356/234, 414; 350/311, 350/312, 317; 505/828, 848; 359/723, 885

[56] References Cited

U.S. PATENT DOCUMENTS

| | | |
|---|---|---|
| H39 | 3/1986 | Gubser et al. . |
| 3,623,795 | 11/1971 | Taylor et al. . |
| 3,773,684 | 11/1973 | Marks . |
| 3,790,250 | 2/1974 | Mitchell et al. . |
| 3,818,390 | 6/1974 | Gikow et al. . |
| 3,857,114 | 12/1974 | Minet et al. . |
| 3,956,727 | 5/1976 | Wolf . |
| 4,093,353 | 6/1978 | Lang . |
| 4,099,854 | 7/1978 | Decker et al. . |
| 4,114,985 | 9/1978 | Friedman . |
| 4,180,605 | 12/1979 | Gilbert et al. . |
| 4,261,331 | 4/1981 | Stephens . |
| 4,307,942 | 12/1981 | Chahroudi . |
| 4,499,441 | 2/1985 | Lynch et al. . |
| 4,521,682 | 6/1985 | Murakami et al. . |
| 4,657,345 | 4/1987 | Gordon . |
| 4,707,303 | 11/1987 | Buckley et al. .................. 350/311 |
| 4,713,795 | 12/1987 | Woike et al. . |
| 4,719,342 | 1/1988 | Cohn et al. . |
| 4,737,000 | 4/1988 | Garlick et al. . |
| 4,754,384 | 6/1988 | Levy et al. . |
| 4,818,898 | 4/1989 | Anderson et al. ................. 350/311 |
| 4,855,078 | 8/1989 | Leslie ................................. 252/582 |

OTHER PUBLICATIONS

Muirhad, C. M.; "Squids and Aerial Application"; IEE Colloq. in High Temp. Superconductors; Dig. 114, pp. 7/1-4, Nov. 9, 1988, abst. only.

Khamas et al.; "High to Superconducting... Antenna"; Electron. Lett., vol. 24, #8, pp. 460-461, Apr. 14, 1988; abst. only.

Pankratov et al.; "Spectral Manifestations . . . "; Opt. Spectrosh.; vol. 41, #6, pp. 983-989, Dec. 1976; abst. only.

Primary Examiner—Nelson Moskowitz
Attorney, Agent, or Firm—Bobby D. Scearce; Donald J. Singer

[57] ABSTRACT

An optical reflection band filter structure for selectively blocking radiation within a preselected range of wavelengths is described which comprises a plurality of multipole elements of preselected configuration deposited with prescribed spacing in a periodic array on a substrate of dielectric material, each multipole configuration comprising a central element of metal and having shape corresponding to the overall shape of the multipole and a plurality of spaced metal segments, each space between adjacent segments being filled with a segment of material characterized by a transition from superconducting phase to insulating phase upon being heated to a characteristic transition temperature, each transition segment disposed outwardly from the center of the multipole element having lesser thickness than, or different composition from, the next inwardly disposed transition segment, the innermost transition segments having thickness substantially equal to that of the metal segments and central element.

33 Claims, 2 Drawing Sheets

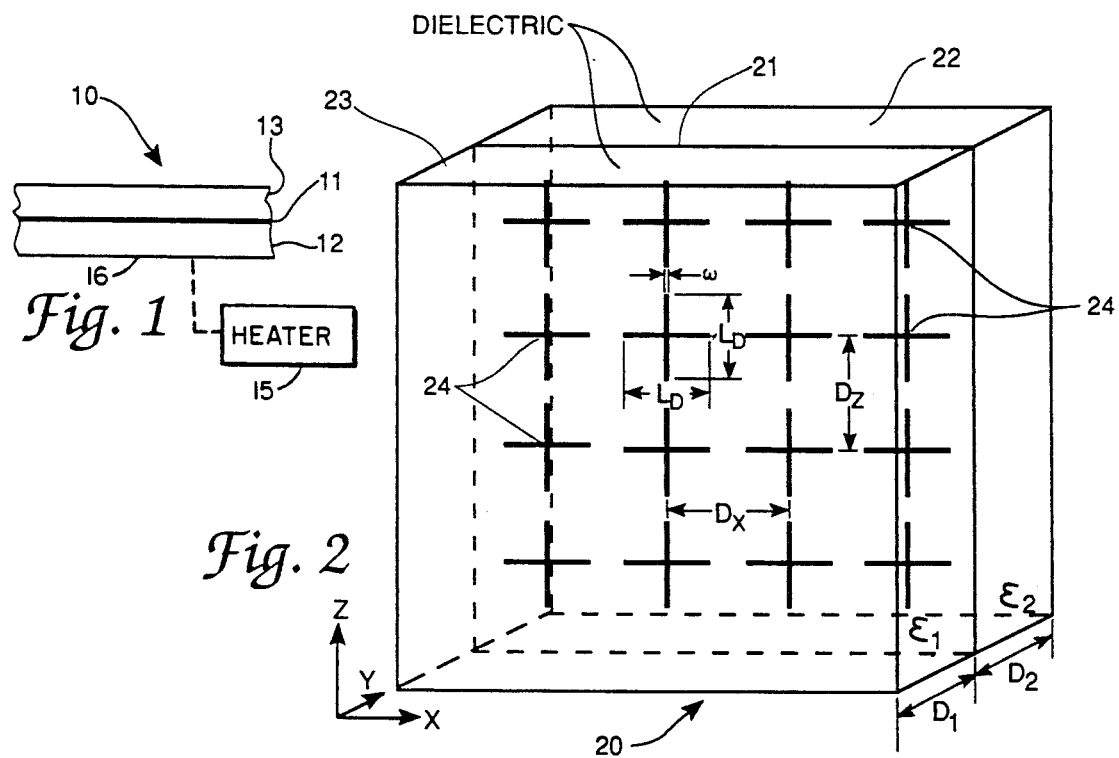
Fig. 1
Fig. 2
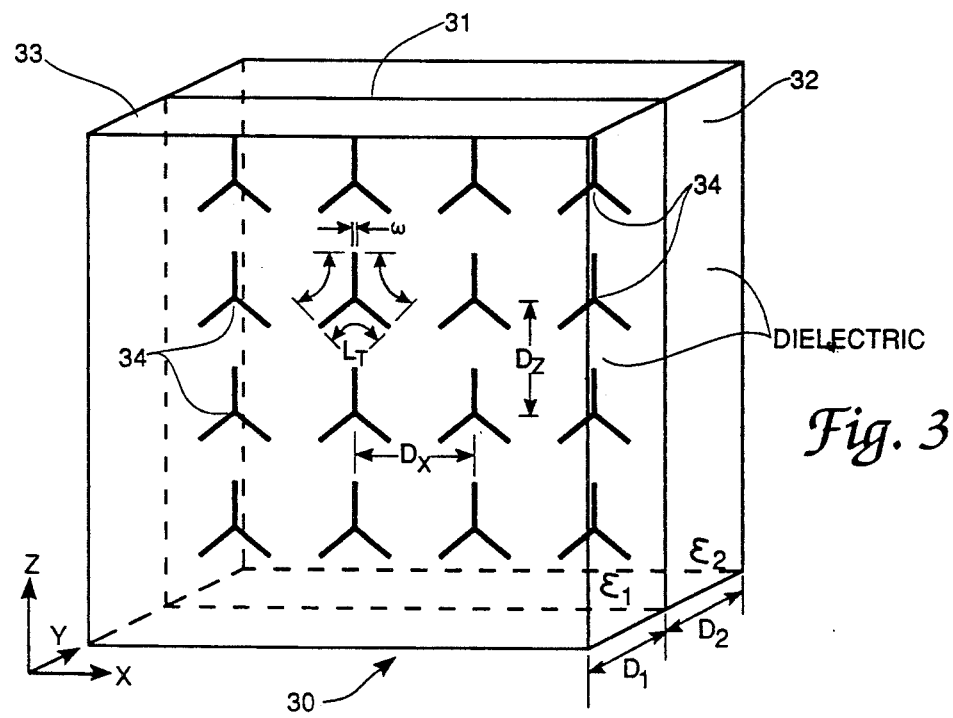
Fig. 3

SUPERCONDUCTING REFLECTION FILTER

RIGHTS OF THE GOVERNMENT

The invention described herein may be manufactured and used by or for the Government of the United States for all governmental purposes without the payment of any royalty.

CROSS-REFERENCE TO RELATED APPLICATIONS

The invention described herein is related to copending application Ser. No. 07/172,119 filed Feb. 23, 1984, entitled "Inorganic Filter"; Ser. No. 06/841,389 filed Mar. 5, 1986, entitled "Reflection Filter", Ser. No. 06/841,388 filed Mar. 5, 1986, entitled "Bearching Filter", Ser. No. 07/386,799 filed Jul. 20, 1989, entitled "Superconducting Submicron Filter" and Ser. No. 07/386,798 filed Jul. 20, 1989, entitled "Superconducting Searching Filter", each of which have the same assignee as that of the present application.

BACKGROUND OF THE INVENTION

The present invention relates generally to laser hardened materials and structures, and more particularly to a novel optical filter structure for selectively blocking laser radiation of predetermined wavelength while passing radiation of other wavelengths.

Optical switching devices comprising transition or switching materials which are optically transparent in one state but which transform to an opaque metallic state when heated to a characteristic transition temperature are well developed for applications such as optical filters, modulators, laser output couplers, and the like. These devices are generally characterized by a transition from substantial transparency below the characteristic transition temperature to substantial opacity above that temperature, at all wavelengths.

In accordance with the teachings of copending application Ser. No. 07/172,119, which teachings are incorporated herein by reference, an optical filter structure was described for selectively blocking radiation of predetermined wavelength comprising a layer of material characterized by transition from non-metal to metal, corresponding to a change from transmissive to reflective states upon being heated to a characteristic transition temperature, deposited on a slab of dielectric material in the form of a plurality of multipole elements in an array of predetermined spacing between adjacent rows and columns of the array. The filter of the 07/172,119 application is characterized by substantial transparency to all radiation wavelengths below its characteristic transition temperature, and opacity only to the predetermined wavelength, and substantial transparency to all other wavelengths, above the transition temperature, and is constructed by applying a film of thermal switching material in the form of an array of microwave-type multipole elements of optical dimensions, the film being applied to a dielectric slab, or sandwiched between two dielectric slabs.

For purposes of describing the invention and defining the scope thereof, the term "optical" shall, in accordance with the customary usage, be defined herein to include only ultraviolet, visible, near infrared, mid-infrared and far infrared regions of the electromagnetic spectrum lying between about 0.1 to about 1000 microns (see e.g. *Optical Physics*, by Max Garbuny, Academic Press, New York, 1965, pp 1-6), and more specifically to the range of from about 0.2 micron, the approximate lower limit of operation of fine quality quartz lenses (Garbuny, p 280), to about 50 microns, the approximate upper limit of operation of long wavelength transmitting material such as KRS-5 (thallium bromide-iodide ionic crystal) (Garbuny, p 282).

The invention provides a substantially improved optical reflection band filter capable of actively or passively sweeping a preselected range of wavelengths and locking in on a wavelength within that range to effectively block that wavelength while substantially passing all others. It is noted that, in addition to the preselected wavelength sought to be blocked, a basic resonant wavelength corresponding to the overall size of the elements may also be blocked. The invention is constructed by depositing a periodic array of microlithographic patterns of conducting metal in the form of microwave antenna type multipole elements of optical dimensions, preselected according to a desired characteristic wavelength range to be swept. The metallic elements comprise small spaced-apart metal segments interconnected by sections of superconducting-to-insulator phase transition materials deposited in the spaces between adjacent metallic segments. Each successive phase transition section from the center of each pattern outwardly has predetermined lesser thickness than the next inwardly situated transition section. Upon heating the array by a controllable heater contacting the filter or by impinging laser radiation, the interconnection sections switch from superconducting to insulating at different temperatures or at different heating rates for each set of interconnections, providing wavelength sweeping over the characteristic preselected wavelength reflection band. The invention is therefore a substantial improvement over the totally opaque switching reflection filter, the non-switching metallic element array reflection-band filter, the fixed wavelength switching element reflection band filter, and other wavelength responsive laser hardening devices.

It is therefore a principal object of the invention to provide an improved optical filter.

It is a further object of the invention to provide an optical filter for selectively blocking laser radiation of particular wavelength while passing radiation of other wavelengths.

It is yet a further object of the invention to provide a switchable filter incorporating insulating-to-superconducting materials to provide selective wavelength filtering.

It is yet another object of the invention to provide an optical filter having fast response time.

It is yet a further object of the invention to provide a filter capable of sweeping a reflection band to reflect a preselected wavelength within that band.

These and other objects of the invention will become apparent as the detailed description of representative embodiment proceeds.

SUMMARY OF THE INVENTION

In accordance with the foregoing principles and objects of the invention, an optical reflection band filter structure for selectively blocking radiation within a preselected range of wavelengths is described which comprises a plurality of multipole elements of preselected configuration deposited with prescribed spacing of optical dimensions in a periodic array on a substrate of dielectric material, each multipole configuration comprising a central element of metal and having shape corresponding to the overall shape of the multipole and a plurality of spaced metal segments, each space between adjacent segments being filled with a segment of material characterized by transition from superconducting phase to insulating phase upon being heated to a characteristic transition temperature, each transition segment disposed outwardly from the center of the multipole element having smaller thickness than, or different composition from, the next inwardly disposed transition segment, the innermost transition segments having thickness substantially equal to that of the metal segments and the central element.

DESCRIPTION OF THE DRAWINGS

The invention will be more clearly understood from the following detailed description of representative embodiments thereof read in conjunction with the accompanying drawings wherein:

FIG. 1 is a fragmentary view in section of a layered structure representative of the optical filter of the invention;

FIG. 2 is a perspective view of a layered structure incorporating an array of crossed dipoles according to the invention;

FIG. 3 is a perspective view of a layered structure incorporating an array of tripoles according to the invention;

DETAILED DESCRIPTION

Figure 4:
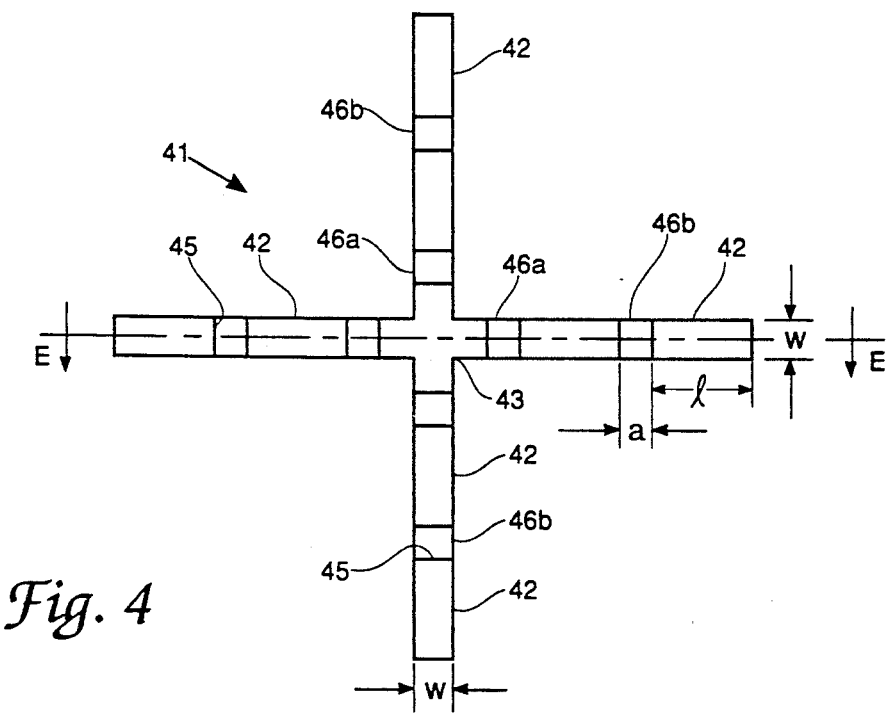
FIG. 4 is a plan view of a crossed dipole element structured according to the invention.

Referring now to FIGS. 1–3, shown therein are layered structures including dipole and tripole elements and representative of arrays which may be deposited according to the teachings of the invention. As shown in FIG. 1, a reflection filter 10 of the invention may comprise a layer 11 of an array of elements deposited in predetermined pattern and spacing as herein described on a supporting substrate 12 of dielectric material. A second slab or layer 13 of dielectric material may be applied over layer 11 to form the sandwich structure shown, if desired. Dielectric substrate 12 or slab 13 may include semiconductors, ionic crystals, covalent crystals, glasses, polycrystalline materials, amorphous materials, polymers and other organic materials, all generally characterized as transparent insulators or semiconductors, substantially transparent to optical wavelengths in the range from about 0.2 to 50.0 microns.

Layer 11 comprises a periodic array of microwave antenna type multipole elements of novel structure deposited on substrate 12. As shown in FIG. 2 and 3, layers 21, 31 comprising representative arrays of multipole elements of respective filters 20, 30 may comprise a rectilinear, square array of crossed dipoles 24 or tripoles 34, respectively deposited on substrates 22, 32 of substantially transparent dielectric material of dielectric constant $\epsilon_2$, and covered by optional slabs 22, 33 of dielectric material of dielectric constant $\epsilon_2$. Layers 21, 31 of filters 20, 30 may be otherwise configured, within the scope of these teachings, in other geometric forms, and may include single dipoles, grids, crosses, circles, and staggered multipole patterns as might occur to one with skill in the field of the invention. Further, selected multipole patterns may be deposited to any desired thickness as appropriate, in any periodic array and orientation with respect to each other, within the contemplation of the teachings herein, as to define a hexagonal, diamond, circular or other desired pattern as a particular application requires.

Figure 5:
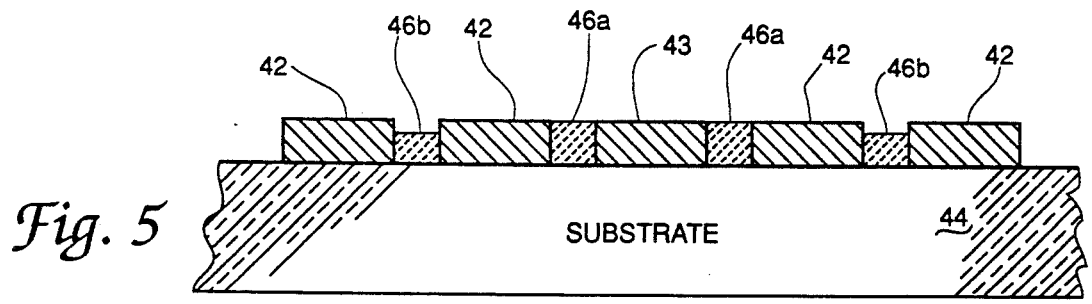
FIG. 5 is a sectional view of the element of FIG. 4 taken along lines E—E.

Referring now to FIG. 4 and 5, shown therein are a plan view of a representative multipole element of the invention in the form of a crossed dipole element 41, and a sectional view of element 41 taken along line E—E. Referring specifically to FIG. 4, element 41 comprises a crossed pattern of plurality of conducting metal segments 42 and a central cross-shaped conducting metallic element 43. Central element 43 has a shape (a cross in FIG. 4) corresponding to the overall shape of the multipole element. Metallic segments 42 and central element 43 are of preselected length l, width w, spacing a, and substantially uniform thickness and may be deposited on dielectric substrate 44 (FIG. 5) using known deposition techniques including x-ray, electron beam or ion beam lithography, photolithography, or other appropriate technique known in the relevant art. Metals suitable herein for comprising metal segments 42 and central element 43 include aluminum, gold, copper, tin, nickel, as would occur to one with skill in the applicable art. In a preferred embodiment of the invention, metal segments 42 and central element 43 comprised aluminum and were of equal lengths. Between adjacent segments 42 and between central element 43 and surrounding metal segments 42 are gaps 45 of preselected, substantially equal widths a.

The structure of each multiple element such as represented by dipole element 41 of FIGS. 4 and 5 is completed by depositing into each gap 45 segments 46 interconnecting adjacent metal segments 42 and comprising a material which undergoes a superconducting-to-insulating phase transition upon being heated to a characteristic transition temperature $T_c$. Suitable material for segments 46 include, but are not necessarily limited to, ceramics such as the Ba-La-Cu-O system including $Ba_xLa_{5-x}Cu_5O_{5(3-y)}$, $Ba_xLa_{1-x}CuO_{3-y}$, and $Ba_xLa_{2-x}CuO_{4-y}$; the Sr-La-Cu-O system including $SR_xLa_{2-x}CuO_{4-y}$ and $(Sr_xLa_{1-x})_2CuO_{4-x}$; the Y-Ba-Cu-O system including $YBa_2Cu_3O_{9-y}$ and $Y_{0.87}Ba_{1.53}Cu_3O_y$; the Ba-Sr-La-Cu-O system including $(Ba,Sr)_xLa_{2-x}CuO_{4-y}$; the La-Cu-O system including $La_2CuO_4$; and the Ba-Pb-Bi-O system including $BaPb_{1-x}Bi_xO_3$, and organic semiconductors such as copper-doped, silver-doped or gold-doped tetracyanoquinodimethane (TCNQ), Insulating-to-superconducting transition temperatures $T_c$ range from about 0.3° to 120° K. Segments 46 of transition material may be deposited using substantially standard lithography techniques such as those mentioned above for metal segments 42 and central element 43, x-ray lithography being preferred method as offering optimum resolution.

Figure 6:
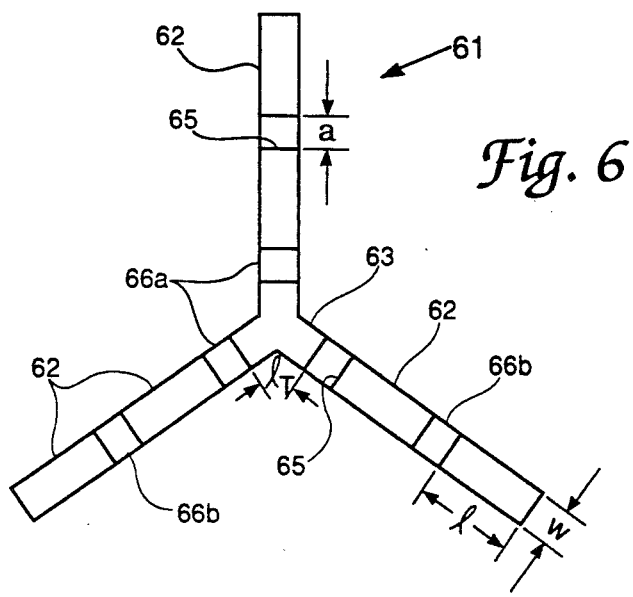
FIG. 6 is a plan view of a tripole element structured according to the invention.

Referring now to FIG. 6 shown therein is a plan view of another representative multipole element of the invention in the form of tripole 61. Tripole 61 comprises a preselected plurality of metal segments 62 and central element 63 (again, having shape corresponding to that of tripole 61), gaps 65 and segments 66 all of predetermined dimensions and deposited in manner corresponding to that characterizing dipole element 41 of the FIG. 4 embodiment.

Referring now to FIG. 5, each segment 46a, b of crossed dipole element 41 (or 66a, b of tripole 61 of FIG. 6) has a thickness depending on its position from the center of element 41. Segment 46a has predetermined thickness substantially equal to that of adjoining metal segments 43 and 42 and greater than that of segment 46b, and as discussed below, the temporal switching of segments differ slightly according to their respective thicknesses, the thinner segments switching faster under constant heat input. In a multipole structure of the invention comprising a number of metal segments 42 or 62 greater than that depicted in FIG. 4 or 6, each radially outwardly positioned segment 46 or 66 has thickness smaller than the next radially inwardly disposed segment 46 or 66 with the innermost disposed segment preferably having thickness corresponding to metal segments 43 and 42, each segment 46 or 66 having a transition rate corresponding to its thickness.

An alternative structure to those described above for varying the transition temperatures of the element segment includes element segments comprising different materials or otherwise characterized different critical temperatures.

Referring now again to FIGS. 2 and 3, the crossed dipoles 24 of layer 21 of FIG. 2 lie in the x-z plane coincident with layer 21. Dipoles 24 are separated by distances of optical dimensions designated by $D_x$ between adjacent columns and $D_z$ between adjacent rows and have predetermined overall length $L_D$ and width w. Dielectric substrate 22 has thickness $D_2$ and dielectric constant $\epsilon_2$, and slab 23 has thickness $D_1$ and dielectric constant $\epsilon_1$, and each are preferably transparent to radiation over substantially all wavelengths of interest. Therefore, light traveling, for example, along the y coordinate impinges first upon dielectric 23. The area of each crossed dipole is given by $2wL_D$ and the fractional cross-sectional area $R_d$ occupied by the crossed dipoles 24 may be expressed as, $$R_d = 2wL_D/D_xD_z \qquad (1)$$

For the configuration of FIG. 3 comprising tripoles 34, a similar analysis applies. Referring now to FIG. 3, the area of each tripole 34 may be expressed as $3wL_T/2$, and the fractional cross-section between $R_t$ occupied by the tripoles 34 may be expressed as.

$$R_t = 3wL_T/2D_xD_z \qquad (2)$$

Similar analyses may be performed to obtain equivalent expressions for R for multipole elements in other configurations.

At a temperature above the highest critical temperature of the respective segments 46 or 66, the filter has a reflection band characteristic of the length l and spacing a of the metal segments. The relationship with the central wavelength $\lambda_1$ of the reflection band for a crossed dipole (and single dipole) element is approximated by, $$l \approx 0.5 \, (\lambda_1/N_{eff}) \qquad (3)$$

and for the central tripole element by, $$l_T \approx 0.55 \, (\lambda_1/N_{eff}) \qquad (4)$$

where $N_{eff}$ is the effective index of refraction given by, $$N_{eff} = \left( \frac{\epsilon_1 + \epsilon_2}{2} \right)^{\frac{1}{2}} \qquad (5)$$

where each respective dielectric constant is effectively equal to the square of the corresponding material refractive index. Thus, the range of the product of element length times effective refractive index may lie in the range of from about 0.1 micron to about 25 microns. The length of the metal segments is chosen so that $\lambda_1$ is located on the short wavelength side of the operational wavelength range $\lambda_a$ to $\lambda_b$ of the protected optical system, i.e., $$\lambda_1 < \lambda_a. \qquad (6)$$

Additional reflection losses within the operational wavelength range are small and can be overcome by antireflection coatings. In the case of tripoles, the resonance of the central segment is given by Eq (4) but the resonance of the additional segments is still given by Eq (3). The segment length must be chosen to give an additional common resonance at $\lambda_1$.

To further understand how the filter operates consider the case in which the interconnections between the element segments are cooled until the innermost interconnections switch at a temperature $T_c$; for example, $T_c$ is about 85° K. for the new high-temperature superconducting materials. At a temperature equal to or greater than $T_c$, the resonance is now determined by elements composed of three segments plus the innermost interconnections. If the length of the interconnections is $\Delta$, the resonance condition for crossed dipoles is now, $$l + 2(\Delta + l) \approx 0.5 \left( \frac{\lambda_2}{N_{eff}} \right) \qquad (7)$$

and for tripoles;

$$l_T + 2(\Delta + l) \approx 0.55 \left( \frac{\lambda_2}{N_{eff}} \right) \qquad (8)$$

where $\lambda_2$ lies within the optical system operational wavelength range $\lambda_a$ to $\lambda_b$; i.e., $$\lambda_a < \lambda_2 < \lambda_b \qquad (9)$$

If the reflection band centered about $\lambda_2$ coincides with an invasive wavelength $\lambda_0$, the filter will successfully reflect the invasive laser radiation. Otherwise the substrate must be further cooled until the second set of interconnections is switched. The process may be continued to any degree desired, depending upon the length and number of segments and interconnections. The general resonance condition for crossed dipoles will be, $$l + (J - 1)(2)(\Delta + l) \approx 0.5 \left( \frac{\lambda_J}{N_{eff}} \right) \qquad (10)$$

and for tripoles, $$l_T + (J-1)(2)(\Delta + l) \cong 0.55 \left( \frac{\lambda_J}{N_{eff}} \right) \quad (11)$$

where $\lambda_a < \lambda_J < \lambda_b; J > 1$. (12)

The periodic array of antenna elements will produce a moderately narrow reflection band from about 93% to about 97% reflectivity about a central wavelength $\lambda_J$. The calculation of the peak value of the reflection band is complex and can be evaluated numerically, and the final fine tuning of the reflection band is normally an empirical process, the details of which are not disclosed herein.

Assume the maximum continuous length of all metal and transition segments in the metallic state at a given temperature in a crossed dipole element 41 to be $L_D$ and the corresponding tripole 61 length is $L_T$. The corresponding resonant wavelength is labeled $\lambda_{max}$. $L_D L_T$ being given, the other dimensions of the multipole are selected. The spacing between rows and columns is kept below $\lambda_{max}/2$ to avoid grating lobes, but the spacing must be large enough that adjacent elements do not touch. A best estimate of minimum spacing may be a value greater than about one-tenth the length of the elements (i.e., about one-twentieth the design wavelength). In most cases this implies, $$D_x = D_z \cong L_D \text{ or } L_T \quad (13)$$

The size of w affects the width of the reflection band, which is a function of w/l. The exact mathematical dependence is exceedingly complicated, but the reflection bandwidth increases with element width. The element width parameter is best determined empirically, a major consideration being the transmission required within the system operational wavelength band $\lambda_a$ to $\lambda_b$ and at temperatures above $T_c$, as governed by Eqs (1) and (2).

Consider as an example that a filter of the crossed dipole array configuration of FIGS 2, 4 and 5 is required to operate in the 3–14 micron range. A dielectric slab 22 of ZnS (refraction index = 2.25) may be selected. Assume no covering slab 23 is used (i.e., $\epsilon_1 = 1.0$). From Eq (5), $$N_{eff} = \left( \frac{1 + (2.25)^2}{2} \right)^{\frac{1}{2}} = 1.74$$

Assume laser radiation at 5.8 microns and 10.0 microns is to be blocked when all interconnections are switched. The length l of the metallic elements (e.g., aluminum) may be chosen to be three times the length a of the transition material interconnections. Eq (10) gives, $$19a = 0.5 \frac{(10.0 \text{ microns})}{1.74} = 2.87 \text{ microns}$$

or a = 0.151 microns, and l = 3a = 0.453 microns. With only innermost interconnections switched, the resonance condition becomes $$11a = 0.5 \frac{(\lambda_2)}{1.74}$$

$\lambda_2 = 5.79$ microns.

The resonance of the unswitched arrays is $$3a = 0.5 \frac{(\lambda_1)}{1.74}$$

$\lambda_1 = 1.58$ microns, which lies outside the operational range of the optical system sought to be protected from incoming laser radiation. Letting $D_x = D_z = 20a = 3.02$ microns, satisfies the requirement that $D_x$ and $D_z$ are less than $\lambda_0/2$ and ensures that the elements 24 in adjacent rows and columns do not touch. The value of w is determined empirically to obtain the desired bandwidth, but some limitations are imposed by the inband absorption to be tolerated below the transition temperature. For w = 0.2 micron, the absorption Ab calculated from the expression of Eq (1) for Rd is, $$Ab = R_d = \frac{(2)(0.2 \text{ microns})(2.87 \text{ microns})}{(3.02)^2} = 0.126$$

or about 13%. Thus, a trade-off is to be made among the bandwidth, the transmission of the unswitched state filter, and the limitations of present lithographic techniques.

In the representative embodiments of the reflection filter of the invention as shown in FIGS. 2–6, the filter is configured to have a characteristic optical reflection band which includes a range of anticipated wavelengths of an incident radiation beam, such as of an invasive laser beam. As the filter is heated by the invasive radiation, selected transition material segments transistion from superconducting to insulating phase, thereby passively sweeping its characteristic reflection band until it locks onto the specific invasive wavelength $\lambda_0$.

The substrate is placed within a cryogenic cooler but locally is actively heated, as by heater 15, and its temperature controlled by any of various methods. For example, substrate 12 may itself be used as a heater with appropriate electric leads attached to substrate 12; in this example it is desirable for substrate 12 to be a semiconductor. Alternatively, a transparent and electrically conducting layer 16 of tin oxide or equivalent material may be disposed on substrate 12, as suggested in FIG. 1, with appropriate electrical leads attached near the edge of the substrate. In another embodiment, layer 16 may comprise a grid of resistive metal wire (e.g., nichrome), the grid dimensions being selected to avoid diffraction effects which may interfere with the antenna pattern operation characterizing the filter of the invention.

As a further embodiment of the invention, the central wavelength of the reflection band may also be passively varied by the heating or electrical field of impinging laser radiation. In this case the filter is maintained at a temperature slightly below $T_c$, causing all interconnections to be in a superconducting state, and the filter reflection band located at the longest wavelength position. As more heat is added to the filter, the interconnecting elements progressively switch from the outermost to innermost, until the filter locks on to the laser wavelength at $\lambda_0$.

The invention therefore provides an optical reflection band filter device for actively or passively sweeping a preselected reflection wavelength band to block preselected discrete, tunable wavelengths within that band while passing substantially all other wavelengths. The response of the filter is wavelength independent prior to switching, and absorption losses (less than about 10–13% due mostly to the geometry of the array elements) are minimized due to the switching mechanism which characterizes filter operation. Because of the small thermal mass and thermal isolation of the transition segments, the filter has a time constant for switching substantially faster than that for existing devices characterized by opaque switching or by fixed wavelength switching, may comprise optical substrates configured in substantially any size and shape, and may be effective in its function at angles of incidence of impinging radiation up to about 80° from normal. The invention may therefore find substantial use as a protective optical filter against laser weapons.

It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An optical filter structure for selectively blocking radiation of predetermined wavelength, comprising:
   (a) a first layer of dielectric material;
   (b) a plurality of multipole elements in predetermined periodic array and spacing on said first layer, each multipole element including:
   (i) a central metal element of shape generally corresponding to that characterizing each multipole element;
   (ii) A plurality of spaced apart metal segments of predetermined length and of width and thickness corresponding substantially to that of said central metal element, the spacings defined between adjacent metal segments and between said central metal element and adjacent metal segments being substantially uniform of predetermined width; and
   (iii) each of said spacings being filled with a segment of transition material interconnecting corresponding adjacent metal segments, said transition material being characterized by a transition from superconducting phase to insulating phase upon being heated to a characteristic transition temperature.

2. The filter structure of claim 1 wherein each transition material segment disposed outwardly of said central metal element has a characteristic transition temperature greater than that of the next inwardly disposed transition material segment.

3. The filter structure of claim 2 wherein each transition material segment disposed outwardly of said central metal element has thickness smaller than the next inwardly disposed transition material segment, the innermost transition material segments having thickness substantially that of said metal segments and said central metal element.

4. The filter structure of claim 2 wherein each transition material segment disposed outwardly of said central metal element has a different transition material composition than the next inwardly disposed transition material segment.

5. The filter structure of claim 1 wherein said periodic array is rectangular with predetermined spacing between adjacent rows and columns.

6. The filter structure of claim 1 wherein said periodic array is hexagonal.

7. The filter structure of claim 1 further comprising a second layer of dielectric material covering said array.

8. The filter structure of claim 1 wherein said transition material comprises a ceramic.

9. The filter structure of claim 8 wherein said ceramic is a barium-lanthanum-copper oxide.

10. The filter structure of claim 8 wherein said ceramic is a strontium-lanthanum-copper oxide.

11. The filter structure of claim 8 wherein said ceramic is a yttrium-barium-copper oxide.

12. The filter structure of claim 8 wherein said ceramic is a barium-strontium-lanthanum-copper oxide.

13. The filter structure of claim 8 wherein said ceramic is a lanthanum-copper oxide.

14. The filter structure of claim 8 wherein said ceramic is a barium-lead-bismuth oxide.

15. The filter structure of claim 1 wherein said transition material is tetracyanoquinodimethane doped with a metal selected from the group consisting of copper, silver and gold.

16. The filter structure of claim 1 wherein said plurality of multipole elements comprises crossed dipoles.

17. The filter structure of claim 1 wherein said plurality of multipole elements comprises tripoles.

18. The filter structure of claim 1 further comprising means for controllably heating said plurality of multipole elements.

19. An optical reflection filter structure comprising:
   (a) a first layer of dielectric material;
   (b) a plurality of multipole elements in predetermined periodic array and spacing on said first layer, each multipole element including:
   (i) a central metal element of shape generally corresponding to that characterizing each multipole element;
   (ii) a plurality of spaced apart metal segments of predetermined length, and of width and thickness corresponding substantially to that of said central metal element, the spacings defined between adjacent metal segments and between said central metal element and adjacent metal segments being substantially uniform of predetermined width; and
   (iii) each of said spacings being filled with a segment of transition material interconnecting corresponding adjacent metal segments, each successive transition material segment outwardly of said central metal element having thickness smaller than the next inwardly disposed transition material segments, the innermost transition material segments having thickness substantially that of said metal segments and said central metal element, said transition material being characterized by a transition from superconducting phase to insulating phase upon being heated to a characteristic transition temperature.

20. The filter structure of claim 19 wherein said periodic array is rectangular with predetermined spacing between adjacent rows and columns.

21. The filter structure of claim 19 wherein said periodic array is hexagonal.

22. The filter structure of claim 19 further comprising a second layer of dielectric material covering said array.

23. The filter structure of claim 19 wherein said transition material comprises a ceramic.

24. The filter structure of claim 23 wherein said ceramic is a barium-lanthanum-copper oxide.

25. The filter structure of claim 23 wherein said ceramic is a strontium-lanthanum-copper oxide.

26. The filter structure of claim 23 wherein said ceramic is a yttrium-barium-copper oxide.

27. The filter structure of claim 23 wherein said ceramic is a barium-strontium-lanthanum-copper oxide.

28. The filter structure of claim 23 wherein said ceramic is a lanthanum-copper oxide.

29. The filter structure of claim 23 wherein said ceramic is a barium-lead-bismuth oxide.

30. The filter structure of claim 19 wherein said transition material is tetracyanoquinodimethane doped with a metal selected from the group consisting of copper, silver and gold.

31. The filter structure of claim 19 wherein said plurality of multipole elements comprises crossed dipoles.

32. The filter structure of claim 19 wherein said plurality of multipole elements comprises tripoles.

33. The filter structure of claim 19 further comprising means for controllably heating said plurality of multipole elements.

* * * * *